May 11, 1937.   C. G. SEYFERTH   2,080,342
LANDING GEAR
Filed March 8, 1937   4 Sheets-Sheet 1
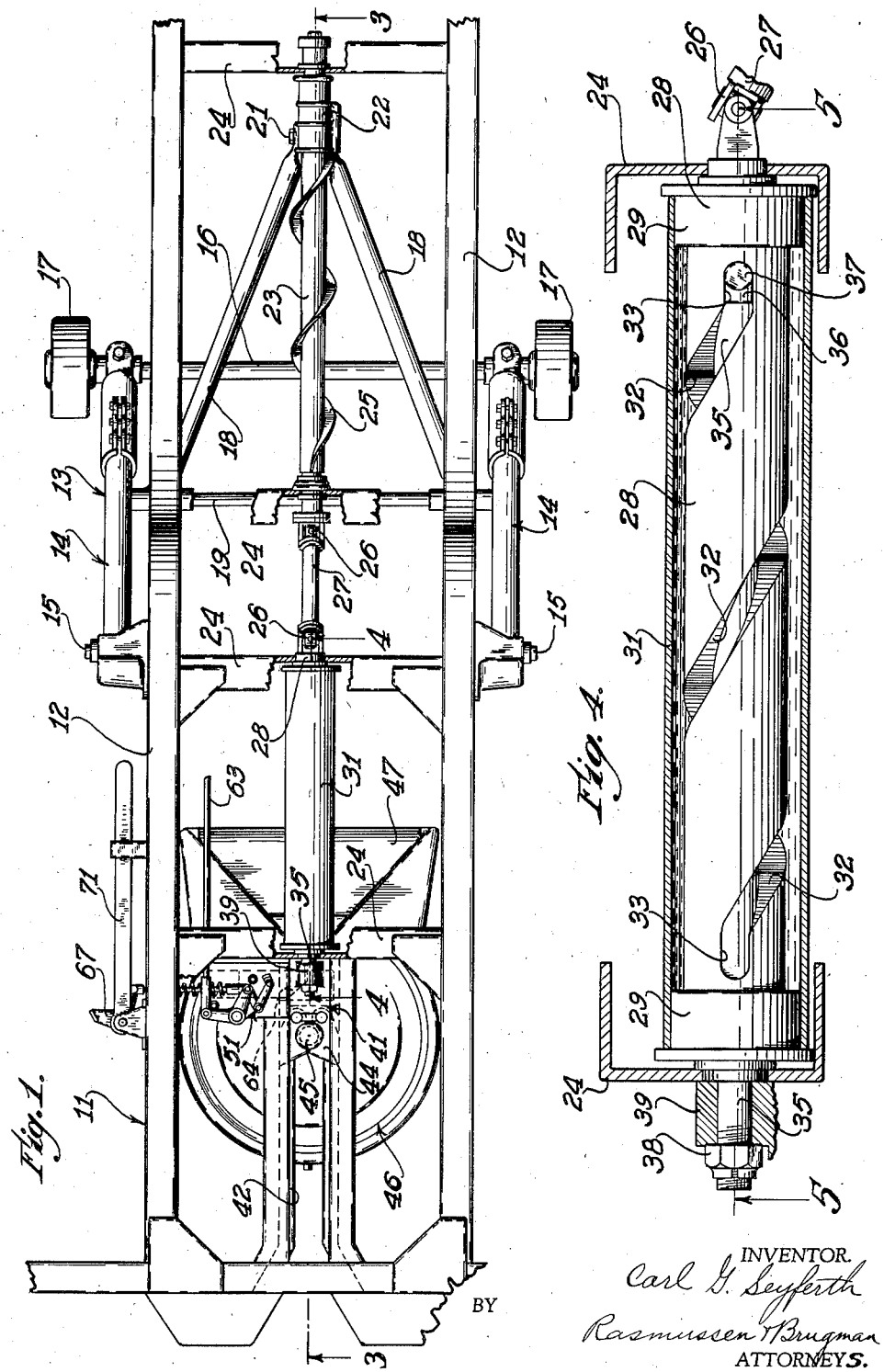
INVENTOR.
Carl G. Seyferth
Rasmussen & Brugman
ATTORNEYS.

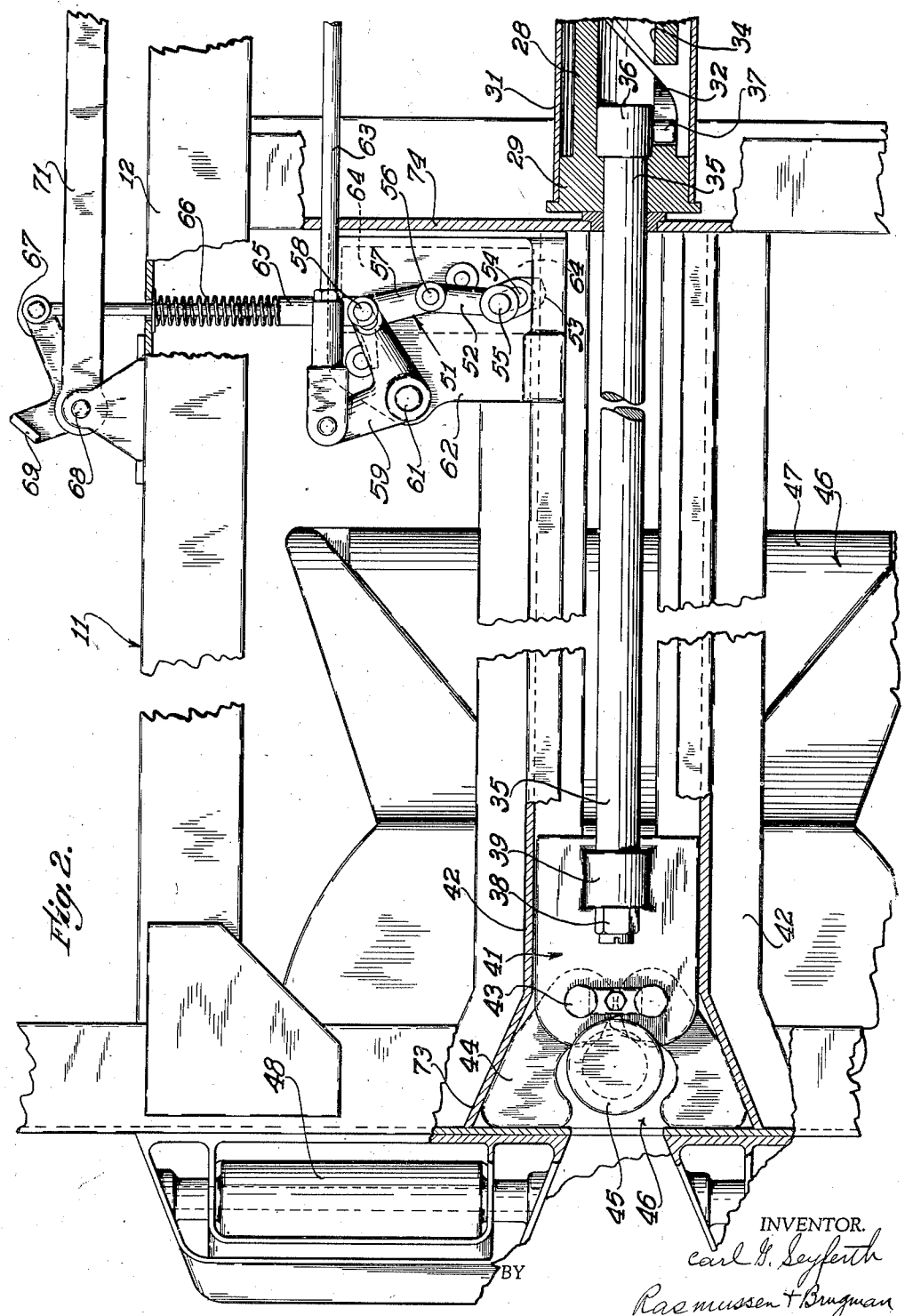

May 11, 1937. C. G. SEYFERTH 2,080,342
LANDING GEAR
Filed March 8, 1937 4 Sheets-Sheet 3
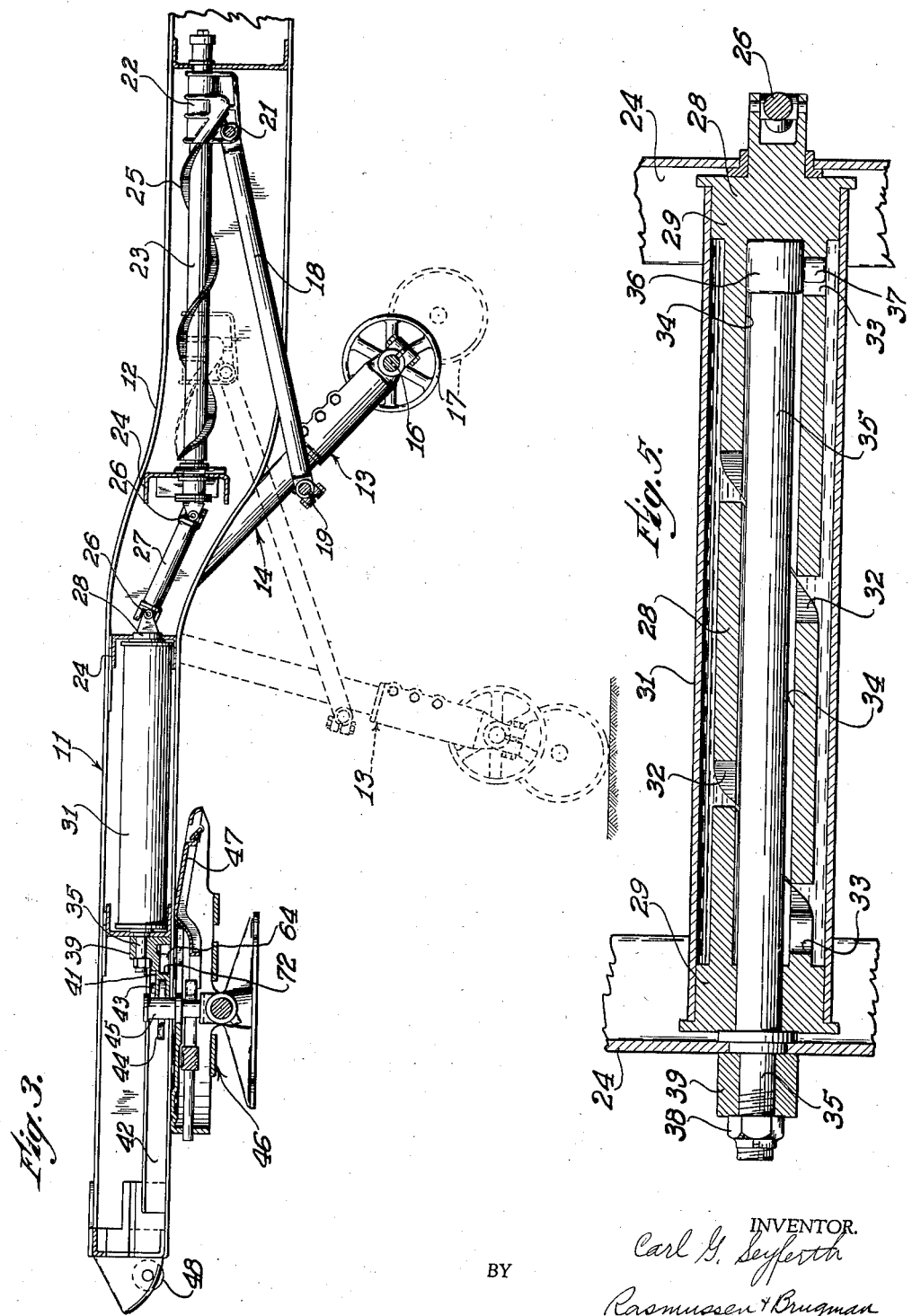
INVENTOR.
Carl G. Seyferth
BY
Rasmussen & Brugman
ATTORNEYS.

May 11, 1937.  C. G. SEYFERTH  2,080,342
LANDING GEAR
Filed March 8, 1937  4 Sheets-Sheet 4
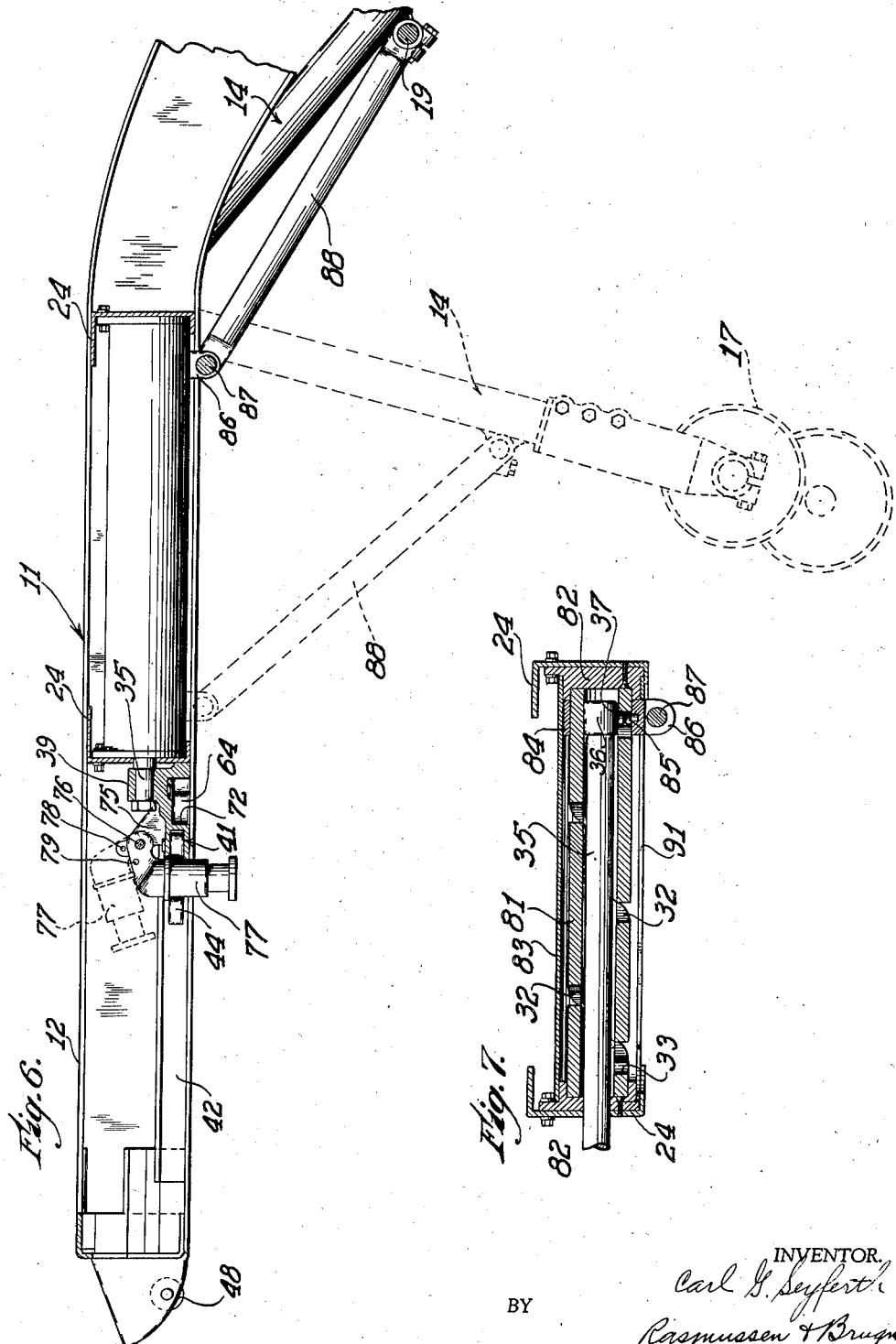

Patented May 11, 1937

2,080,342

UNITED STATES PATENT OFFICE 2,080,342

LANDING GEAR

Carl G. Seyferth, Muskegon, Mich.

Application March 8, 1937, Serial No. 129,599

8 Claims. (Cl. 280—33.1)

This invention relates in general to landing gear, and has more particular reference to an automatically retractable landing gear for semi-trailers and the like.

A principal object of the invention is the provision in a landing gear for semi-trailers having a longitudinally disposed, helically threaded shaft for raising and lowering the supporting mechanism, of novel means for rotating said shaft through the agency of a coupling member on the tractor which is automatically operated in coupling or uncoupling operations of the vehicles.

Another important object of the invention is the provision of such a shaft operating means which is adapted for optional operation by either a male or female coupling mechanism on the tractor.

More specifically, the invention contemplates the provision of coupling mechanism on the trailer which is adapted to be readily engaged by the coupling mechanism on a tractor to be moved thereby relative to the trailer during coupling and uncoupling operations, and of novel connections between such movable trailer coupling mechanism and a longitudinally disposed shaft which is rotatable to raise and lower the landing gear proper.

Numerous other objects and advantages of the invention will be apparent as it is better understood from the following description, which, when taken in connection with the accompanying drawings, discloses a preferred embodiment thereof.

In the drawings,

Figure 1 is a top plan view of a trailer embodying the features of the instant invention, with parts broken away, and showing the tractor fifth wheel mechanism in coupled position and the landing gear in elevated position;

Fig. 2 is an enlarged detail plan view similar to Fig. 1, with parts broken away and partly in section, showing the tractor fifth wheel at an intermediate position in a coupling or uncoupling operation;

Fig. 3 is a vertical sectional view taken substantially on the line 3—3 of Fig. 1;

Fig. 4 is a detail vertical sectional view taken substantially on the line 4—4 of Fig. 1;

Fig. 5 is a detail horizontal sectional view taken substantially on the line 5—5 of Fig. 4;

Fig. 6 is a vertical sectional view similar to Fig. 3 of a modified form of construction; and Fig. 7 is a detail vertical sectional view similar to Fig. 5 of the landing gear operating mechanism of Fig. 6.

Referring more particularly to the drawings, reference numeral 11 indicates in general a trailer or a semi-trailer vehicle having side frame members 12, and which is provided adjacent its forward end with a retractable landing gear 13 of the swinging type.

The landing gear 13 comprises a pair of adjustable wheel carrying members 14 hingedly connected at their upper ends at 15 to the frame members 12 of the trailer, and interconnected at their lower ends by a cross shaft 16 which rotatably supports the usual wheels 17 at its outer ends. A forked or radius rod 18 is pivotably mounted at its spaced, lower ends upon a cross shaft 19 which is connected at its ends to the members 14, and the converged, upper end of the radius rod 18 is pivotally connected at 21 to a head member 22. The head member 22 is mounted upon a longitudinally disposed shaft 23 which is rotatably supported adjacent its ends in cross frame members 24 of the trailer 11. The shaft 23 is provided on its outer surface with a helical rib or ribs 25 of relatively long pitch, and the head member 22 is internally threaded to receive the rib 25 so that rotation of the shaft 23 will cause longitudinal sliding movement of the head 22 on the shaft.

The above described mechanism is similar to that disclosed in U. S. Patent No. 1,686,698 issued to C. H. Land on October 9, 1928, but the mechanism to be hereinafter described for causing rotation of the shaft 23 during coupling and uncoupling operations is entirely different than that shown in the Land patent for accomplishing this purpose.

The forward end of the shaft 23 (Figs. 1 and 3) is connected by means of suitable universal joints 26 and a short shaft 27 to the rear end of a shaft 28 (Figs. 3, 4 and 5). The ends of the shaft 28 are supported by and journaled for rotation in cross frame members 24 of the frame of the trailer 11. Adjacent each end, the shaft 28 is provided with an enlarged portion 29 to which are secured the ends of a tubular cover member 31. The central or reduced portion of the shaft 28 is provided with a helical groove or slot 32 (Figs. 4 and 5) of relatively long pitch, which terminates at its ends adjacent the enlarged portions 29 in longitudinally disposed slots or dwells 33. The reduced portion of the shaft 28 is provided with an axial bore 34 which communicates with the grooves 32 and 33.

A longitudinally disposed shaft 35 is disposed within the bore 34 of the shaft 28 and extends forwardly through a reduced portion of the bore 34 in the enlarged portion 29 at the forward end of the shaft 28. The rearward end of the shaft 35 terminates in a slightly enlarged portion 36, having a sliding fit in the bore 34, which is provided with a radially extending lug 37 rigidly secured thereto or formed integrally therewith. The lug 37 is disposed within the slots 32, 33 so that longitudinal movement of the shaft 35 will rotate the shaft 28.

The forward end of the shaft 35 is rigidly secured by means of a suitable nut 38 to a bracket 39 which is upstanding from and formed integrally with a slidable plate member indicated generally by reference numeral 41 (Figs. 1, 2 and 3). The plate member 41 is supported between and guided for longitudinal movement by a pair of channel members 42 rigidly secured in any suitable manner to the frame of the trailer 11. Pivotally secured to the forward end of the plate member 41 at 43 are a pair of movable jaw members 44.

The jaw members 44 are adapted to engage a king pin 45 which constitutes part of a fifth wheel mechanism indicated generally at 46 which is adapted to be mounted upon a tractor in the usual and well known manner. As shown in the instant drawings, the tractor fifth wheel 46 is convertible into a male or female coupling mechanism, being provided with a removable ramp adapter 47, and the king pin 45 being shown as of the folding type. At its forward end, the frame of the trailer 11 may be provided with suitable rollers 48 (Figs. 2 and 3) which are adapted to ride on the fifth wheel 46 of the tractor during coupling and uncoupling operations in the usual and well known manner.

In such coupling and uncoupling operations, as will be more fully described hereinafter, the plate member 41 is moved longitudinally in the channel members 42 relative to the trailer 11. Means are provided for locking the plate member 41 in its fully coupled or rearward position of Figs. 1 and 3. This means provides a toggle mechanism, indicated generally by reference numeral 51, which is similar to that disclosed in U. S. Patent No. 2,028,400 issued to C. H. Land et al. on January 21, 1936.

Referring more particularly to Fig. 2, the plate locking mechanism 51 comprises a link 52 having a cam-shaped inner end 53 and a slot 54 which co-operates with a rigidly mounted pivot pin 55. The outer end of the link 52 is pivotally connected at 56 to a bell crank 57 which is in turn pivotally connected intermediate its ends by a pin 58 to one arm of a bell crank 59. The bell crank 59 is pivotally mounted at 61 to a supporting housing member 62 which is rigidly secured in any suitable manner to the frame of the trailer 11. The other end of the bell crank 59 is pivotally secured to a rearwardly extending brake rod 63. A latch bar 64 is mounted for transverse sliding movement within the housing 62, and is secured adjacent its outer end to the pivot pin 58. An operating rod 65 is pivotally secured at its inner end to the pin 58, and is urged inwardly relative to the trailer frame by a spring 66 disposed between a shoulder portion of the rod and a side frame member 12. The outer end of the rod 65 is pivotally secured to one arm of a bell crank 67 which is in turn pivotally secured intermediate its ends by a pin 68 to the frame of the trailer. The other arm of the bell crank 67 is provided with an upstanding lug 69 which is adapted to be contacted by a manually operable bar 71 pivotally mounted at one end on the pin 68.

The operation of the toggle locking mechanism 51 is as follows. Being in the position of Fig. 1, the toggle mechanism may be set by counter-clockwise movement of the bell crank 67 imparted by the manually operable lever 71 to assume the position of Fig. 2. The toggle mechanism being in the set position of Fig. 2, rearward movement of the sliding plate member 41 will break the toggle mechanism to permit the spring 66 to move the latch bar 64 inwardly into engagement with a recess 72 (Fig. 3) formed in the plate member 41 to lock the latter in its rearward position. This breaking of the toggle mechanism 51 is accomplished by the plate member 41 contacting the inner cam end 53 of the link 52 to swing the latter in counter-clockwise direction on its pivot pin 55 past dead center position of the links 52 and 57. When it is desired to unlock the plate member 41, the lever 71 is operated to move the toggle mechanism 51 into its position of Fig. 2, which results in the latch bar 64 being withdrawn from the recess 72 in the plate member 41. The slot 54 in the link 52 will permit withdrawal or forward movement of the plate member 41 and return of the link 52 to its position of Fig. 2 in which the locking mechanism is set for automatic operation upon return movement of the plate member 41 to its rearward position.

With the trailer fifth wheel and landing gear mechanism in its full line position of Fig. 2, which corresponds to the dotted line position of the landing gear of Fig. 3, the landing gear supports the forward end of the trailer 11 in uncoupled position of the tractor and trailer. The tractor may then be backed into the trailer, with the tractor fifth wheel 46, including the king pin 45, assuming the position of Fig. 2 after it has ridden in under the front end of the trailer and raised the latter by means of the rollers 48 co-operating therewith in the usual manner. It will be noted that in this intermediate position the king pin 45 has entered between the jaw members 44 and has just contacted the rearward portion of the king pin engaging surfaces thereof. In the prior uncoupling operation of the vehicles, the king pin 45 has moved the jaw members 44 to their open position of Fig. 2, such movement being permitted by the forward ends of the channel members 44 being flared outwardly as shown at 73. Further rearward movement of the tractor relative to the trailer in a coupling operation of the vehicles causes the king pin 45 to move the jaws 44 and the plate member 41 rearwardly relative to the trailer frame, the jaws 44 being swung into king pin engaging position by the king pin and the channel members 42.

As the plate member 41 is thus moved rearwardly to its position of Figs. 1 and 3, the shaft 35 is moved rearwardly relative to the shaft 28. In such rearward movement of the shaft 35, the lug 37 riding in the helical groove 32 rotates the shaft 28. Such rotation of the shaft 28 rotates the shaft 23 through the connecting members 26, 27, which causes the head member 22 to be slid rearwardly thereon from its dotted line position to its full line position of Fig. 3, thus raising the landing gear 13 to its inoperative position. The dwells or longitudinal slots 33 function to retain the landing gear in operative or inoperative position against accidental displacement therefrom. When the plate member 41 has been moved to its extreme rearward position of Figs. 1 and 3, it will be automatically locked therein by the latch bar 64, as above described.

To uncouple the vehicles, the toggle locking mechanism 51 is manually moved to release or set position as above described. Such movement of the toggle mechanism includes a counter-clockwise movement of the bell crank 59 (Fig. 2) to pull the brake rod 63 forwardly to set the trailer brakes. The tractor may then be driven forwardly away from the trailer. In this relative movement between the tractor and trailer, the king pin 45 will slide the plate member 41 forwardly relative to the trailer frame. This will result in a forward sliding movement of the shaft 35 relative to the shaft 28 to rotate the latter, and, through the agency of the members 26, 27, to rotate the shaft 23 to swing the landing gear 13 from its full line position to its broken line position of Fig. 3. Such movement of the landing gear to trailer supporting position will be accomplished when the parts have reached their positions of Fig. 2 and before the tractor has been completely removed from supporting position under the trailer.

Referring now to the modification of Figs. 6 and 7, a landing gear and trailer fifth wheel mechanism is shown therein which is generally similar to that above described. The plate member 41, jaws 44 and associated parts are substantially identical to those of Figs. 1 to 5, with the exception that the plate member 41 is provided with an integral, upstanding bracket member 75 extending forwardly from and adjacent to the bracket 39. A pivot pin 76 is carried by the bracket 75 upon which is pivotally mounted a king pin 77 which is adapted to be swung downwardly into its vertical or full line position of Fig. 6, where it is locked by the pivoted jaws 44. Since the jaws 44 are in closed or king pin engaging position in all but their extreme forward position, as shown in Fig. 2, the adjustment of the king pin between its operative and inoperative positions, as shown in full and broken lines, respectively, in Fig. 6, must be made when the trailer fifth wheel mechanism is in the uncoupled position of Fig. 2.

Connected to the bracket 39, in the same manner as described relative to the modification of Figs. 1 to 5, is the forward end of the longitudinally disposed shaft 35. As shown in Fig. 7, a hollow shaft 81, which is similar to the shaft 28 and is provided with a helical groove 32 terminating in longitudinally disposed slots or dwells 33, is positioned for co-operation with the enlarged rear end 36 and radially disposed lug 37 of the shaft 35. The shaft 81 is journaled for rotation and held against axial movement by a pair of bearing brackets 82 which are secured in any suitable manner to cross frame members 24 of the trailer 11. The bearing members 82 have the ends of a hollow tube or cover member 83, which is similar to the cover member 31, secured thereto so as to surround the shaft 81 in spaced, concentric relationship thereto. Slidably mounted upon the shaft 81 and disposed between the latter and the cover member 83 is a collar member 84 which is provided on its inner, lower surface with a radially disposed lug 85. The lug 85 is disposed within the slot 32, 33 of the shaft 81 in radial alignment with the lug 37 on the enlarged portion 36 of the shaft 35. The collar 84 is provided with a depending bracket portion 86 within which is journaled a stub shaft 87. The radius rod 88 is similar to the rod 18 of the modification of Figs. 1 to 5, and is pivotally mounted at its lower ends on the cross shaft 19 of the landing gear. A longitudinal slot 91 is provided in the lower surface of the cover member 83 through which the bracket portion 85 of the collar 84 extends to permit longitudinal movement of the latter relative to the cover member.

In the operation of the above described modified construction of Figs. 6 and 7, sliding movement of the plate member 41 and shaft 35 will rotate the shaft 81 through the agency of the lug 37 operating in the slot 32. This rotational movement of the shaft 81 will cause longitudinal sliding movement of the collar 84 on the shaft, since the lug 85 is disposed within the slot 32. Longitudinal movement of the collar 84 will swing the landing gear between its full line and broken line positions of Fig. 6 to raise and lower the same between such inoperative and operative positions.

The pivoted king pin 77 is provided for the purpose of permitting the interchangeable use of the above described landing gear and trailer fifth wheel mechanism with tractor fifth wheels having either male or female coupling mechanism. When the king pin 77 is locked in its upper or inoperative position, as shown in broken lines in Fig. 6, the jaw members 44 and plate 41 are adapted to function in the same manner as above described relative to the modification of Figs. 1 to 5 with a tractor fifth wheel having a king pin or male coupling mechanism.

When it is desired to employ the instant mechanism with a tractor fifth wheel having female coupling mechanism, the king pin 77 is moved to its lowered or operative position as shown in full lines in Fig. 6. As has been hereinbefore described, such adjustment of the king pin 77 may be made only when the trailer fifth wheel mechanism is in its forward position with the landing gear in its lower or broken line position of Fig. 6. With the jaws so positioned, the king pin 77 will assume the position of the king pin 45 shown in Fig. 2. Upon the tractor being backed in under the trailer, the female coupling mechanism of the fifth wheel thereon will engage the lower end of the king pin 77. Further rearward movement of the tractor relative to the trailer will move the king pin 77, jaws 44 and plate 41 rearwardly relative to the trailer frame. In the initial part of such rearward movement, the channel members 42 will swing the jaw members 44 into closed or king pin engaging position to lock the king pin 77 in its vertical or operative position. Such rearward movement of the members 77, 44 and 41 will function as above described to raise the landing gear, and the mechanism will be locked in fully coupled position by the latch bar 64 being inserted into the recess 72 in the plate member 41. Similarly, uncoupling of the tractor and trailer with the resultant lowering of the landing gear will be accomplished in the same manner as has been described above.

By providing the fifth wheel mechanism on the trailer which is movable relative thereto, as above described, and the connections between such mechanism and the landing gear, applicant has greatly facilitated the automatic operation of the landing gear during coupling and uncoupling of the tractor and trailer. This results partly from the greatly increased angle of approach or departure that is permitted between the tractor and the trailer. The interchangeability of the trailer fifth wheel mechanism shown in Fig. 6 adds greatly to the practical utility of the instant device. The cover members 31 and 83 function to prevent the accumulation of dirt and other foreign matter in the grooves 32, 33. With the construction shown in Figs. 1 to 5, the cover member 31 facilitates lubrication of the members 28 and 32 to 37, since the cover member 31 may be filled with a suitable lubricant.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a tractor, trailer vehicle, the combination of a longitudinally disposed shaft mounted for rotation on the trailer, a swinging landing gear mounted on said trailer for movement between retracted and trailer supporting positions by the rotation of said shaft, a second longitudinally disposed shaft mounted on said trailer connected to said first shaft for rotating the latter and having an axial bore therein and a helical slot in the walls thereof, a third shaft disposed within the bore of said second shaft and having means co-operating with said helical slot to impart rotation to said second shaft upon longitudinal movement of said third shaft, a cover member surrounding said second shaft for retaining lubricant for the connecting means between said second and third shafts, and means mounted on said trailer and connected to said third shaft and adapted to be moved longitudinally relative to the trailer by a fifth wheel coupling mechanism on the tractor during coupling and uncoupling operations of the vehicle to impart longitudinal movement to said third shaft.

2. In a control means for landing gear, a shaft mounted for rotation and so constructed as to control the position of said landing gear, a second shaft mounted for rotation and operably connected with the first shaft and having an axial bore therein and a helical slot in the walls thereof, and a third shaft disposed within the bore of said second shaft and having means cooperating with said helical slot to impart rotation to said second shaft upon movement of said third shaft, whereby the landing gear may be retracted or extended.

3. In a control means for a movable support, means mounted for rotation and so constructed as to control the position of said movable support, a second means operably connected to said first means and having an axial bore therein, and a third means disposed within said bore of said second means and having means cooperating with cam means associated with said second means, whereby rotation is imparted to said first means and the position of said support is controlled.

4. In a retractible landing gear, means to control the position of said landing gear, including shaft means mounted for rotation and having an axial bore and a helical slot in the walls thereof, and reciprocating means within the axial bore and operably associated with said helical slot, whereby movement of said reciprocating means causes rotation of said shaft means.

5. In a retractible landing gear, means to control the position of said landing gear, including shaft means mounted for rotation and having an axial bore and a helical cam associated therewith, and movable means within said bore operably associated with said cam, whereby movement of said movable means causes rotation of said shaft means.

6. In a retractible landing gear, a device to control the position of said landing gear, including means mounted for rotation, said means having an axial bore and a helical slot associated therewith, movable means adapted to be disposed within said bore and to contact said slot, whereby movement of said movable means results in rotation of said first means, and a casing enclosing said first means.

7. The combination set forth in claim 3, means associated with said third means and locking it against movement when the landing gear is retracted.

8. The combination set forth in claim 3, an outer shell completely enclosing said second means.

CARL G. SEYFERTH.